US008434098B2

(12) United States Patent
Lee et al.

(10) Patent No.: US 8,434,098 B2
(45) Date of Patent: Apr. 30, 2013

(54) SYNCHRONIZING SPLIT USER-MODE/KERNEL-MODE DEVICE DRIVER ARCHITECTURE

(75) Inventors: Mingtzong Lee, Redmond, WA (US); Peter Wieland, Seattle, WA (US); Nar Ganapathy, Redmond, WA (US); Ulfar Erlingson, Reykjavik (IS); Martin Abadi, Palo Alto, CA (US); John Richardson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1165 days.

(21) Appl. No.: 12/027,274

(22) Filed: Feb. 7, 2008

(65) Prior Publication Data

US 2009/0204978 A1    Aug. 13, 2009

(51) Int. Cl.
*G06F 3/00* (2006.01)
*G06F 13/24* (2006.01)
*G06F 11/00* (2006.01)

(52) U.S. Cl.
USPC ......... 719/321; 719/327; 710/260; 714/38.13

(58) Field of Classification Search .................. None
See application file for complete search history.

(56) References Cited

U.S. PATENT DOCUMENTS

| 6,157,959 | A   | 12/2000 | Bonham et al. |
| 6,182,242 | B1  | 1/2001  | Brogan et al. |
| 6,460,151 | B1  | 10/2002 | Warwick et al. |
| 6,871,350 | B2  | 3/2005  | Wong et al. |
| 6,886,111 | B1* | 4/2005  | Tran ........................... 714/38.13 |
| 7,181,382 | B2  | 2/2007  | Shier et al. |
| 7,207,041 | B2  | 4/2007  | Elson et al. |
| 7,950,022 | B1* | 5/2011  | Gould et al. .................. 719/327 |
| 2002/0046364 | A1* | 4/2002 | Yoshimura ...................... 714/38 |
| 2002/0116563 | A1* | 8/2002 | Lever ............................. 710/260 |
| 2003/0140179 | A1* | 7/2003 | Wilt et al. ...................... 709/321 |
| 2005/0015672 | A1* | 1/2005 | Yamada .......................... 714/38 |
| 2005/0050553 | A1* | 3/2005 | Hen et al. ....................... 719/321 |
| 2005/0228923 | A1* | 10/2005 | Zimmer et al. ............... 710/269 |

(Continued)

FOREIGN PATENT DOCUMENTS

WO    2006070939 A1    7/2006

OTHER PUBLICATIONS

"Windows interrupt context kernel overflow exploits", XFOCUS team, 2004, pp. 1-29.*

(Continued)

*Primary Examiner* — Tuan Dao
(74) *Attorney, Agent, or Firm* — Microsoft Corporation

(57) ABSTRACT

A device driver includes a kernel mode and a user-mode module. The device driver may access device registers while operating in user-mode to promote system stability while providing a low-latency software response from the system upon interrupts. The device driver may include kernel stubs that are loaded into the operating system, and may be device specific code written. The stubs may be called by a reflector to handle exceptions caught by the stubs. A reset stub may be invoked by the reflector when the user-mode module or host terminates abruptly or detects an interrupt storm. The reset stub may also be invoked if errant direct memory access DMA operations are being performed by a hardware device. The reset stub may ensure that hardware immediately stops unfinished DMA from further transfer, and may be called by the user-mode driver module.

14 Claims, 4 Drawing Sheets

U.S. PATENT DOCUMENTS

| | | | |
|---|---|---|---|
| 2006/0059496 A1* | 3/2006 | Joy et al. ........................ | 719/310 |
| 2006/0070089 A1 | 3/2006 | Shoaib et al. | |
| 2006/0117325 A1* | 6/2006 | Wieland et al. ............... | 719/321 |
| 2006/0136460 A1* | 6/2006 | Pudipeddi et al. ............ | 707/101 |
| 2006/0218532 A1 | 9/2006 | Cordella et al. | |
| 2006/0248542 A1* | 11/2006 | Wang et al. ................... | 719/321 |
| 2006/0253859 A1 | 11/2006 | Dai et al. | |
| 2006/0259675 A1* | 11/2006 | Talluri et al. .................. | 710/260 |
| 2007/0088890 A1* | 4/2007 | Wieland et al. ............... | 710/269 |
| 2008/0276257 A1* | 11/2008 | Fuchs et al. ................... | 719/327 |

OTHER PUBLICATIONS

"Safe Device Driver Model Based on Kernel-mode JVM", Chen et al., 2007, pp. 1-8.*

"Profiling Interrupt Handler Performance through Kernel Instrumentation", Moore et al., 2003, pp. 1-8.*

"Design Note: Kernel Interrupt and Concurrency Management", Shapiro, 2006, pp. 1-8.*

"User Level Device Drivers for Linux", http://www.gelato.unsw.edu.au/IA64wiki/UserLevelDrivers, Dec. 24, 2007.

"WinDriver—C/C++ Device Driver Development Toolkit", http://www.singaporegateway.com/maverick/windriver/windriver.htm, Dec. 24, 2007.

Ganapathy, et al., "Microdrivers: A New Architecture for Device Drivers", Proceedings of the 11th Workshop on Hot Topics in Operating Systems (HotOS XI), Date: May 2007, pp. 1-6, San Diego, California.

* cited by examiner

SYNCHRONIZING SPLIT USER-MODE/KERNEL-MODE DEVICE DRIVER ARCHITECTURE

BACKGROUND

Drivers in operating systems run in either user-mode or kernel-mode. User-mode drivers run in the non-privileged processor mode in which other application code, including protected subsystem code, executes. User-mode drivers cannot gain access to system data or hardware except by calling an application programming interface (API) which, in turn, calls system services. Kernel-mode drivers run as part of the operating system's executive, the underlying operating system component that supports one or more protected subsystems.

User-mode and kernel-mode drivers have different structures, different entry points, and different system interfaces. Whether a device requires a user-mode or kernel-mode driver depends on the type of device and the support already provided for it in the operating system. Most device drivers run in kernel-mode. Kernel-mode drivers can perform certain protected operations and can access system structures that user-mode drivers cannot access. Moreover, kernel-mode drivers often offer lower-latency services. However, kernel-mode drivers can cause instability and system crashes if not implemented properly, as well as introduce security vulnerabilities.

SUMMARY

A device driver framework in a computing system may include a user-mode module, one or more kernel stubs including a reset stub, a shared memory to share information between the user-mode module and the kernel stubs, and a reflector to manage communication between the user-mode module, the kernel stubs, and an application. The kernel stubs may include code that is invoked as an interrupt service routine in response to an interrupt received from a device and write information from the device to the shared memory. The user-mode module may then read information from the shared memory. After executing the interrupt service routine, the kernel stub may hand off handling of the interrupt to the user-mode module. The kernel stub may be protected using a software-based fault isolation mechanism that monitors for exceptions such as an interrupt storm. Upon detecting an interrupt storm, the reset stub may stop a hardware device from generating the interrupts to maintain system stability. The kernel stubs may synchronize with the interrupt service routine and/or user-mode module using a Deferred Procedure Call.

In some implementations, a method includes loading a user-mode driver associated with a device; loading kernel stubs having a reset stub associated with the user-mode driver in a kernel of an operating system; receiving an interrupt; invoking the kernel stub to perform an interrupt service routine; monitoring for an exception; and obtaining information about the interrupt using the user-mode driver.

In some implementations, a method includes receiving an interrupt from a hardware device; invoking an interrupt service routine; monitoring for an exception; reading information from the hardware device by a kernel stub; storing the information in a shared memory; and sending the interrupt to a user-mode driver.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
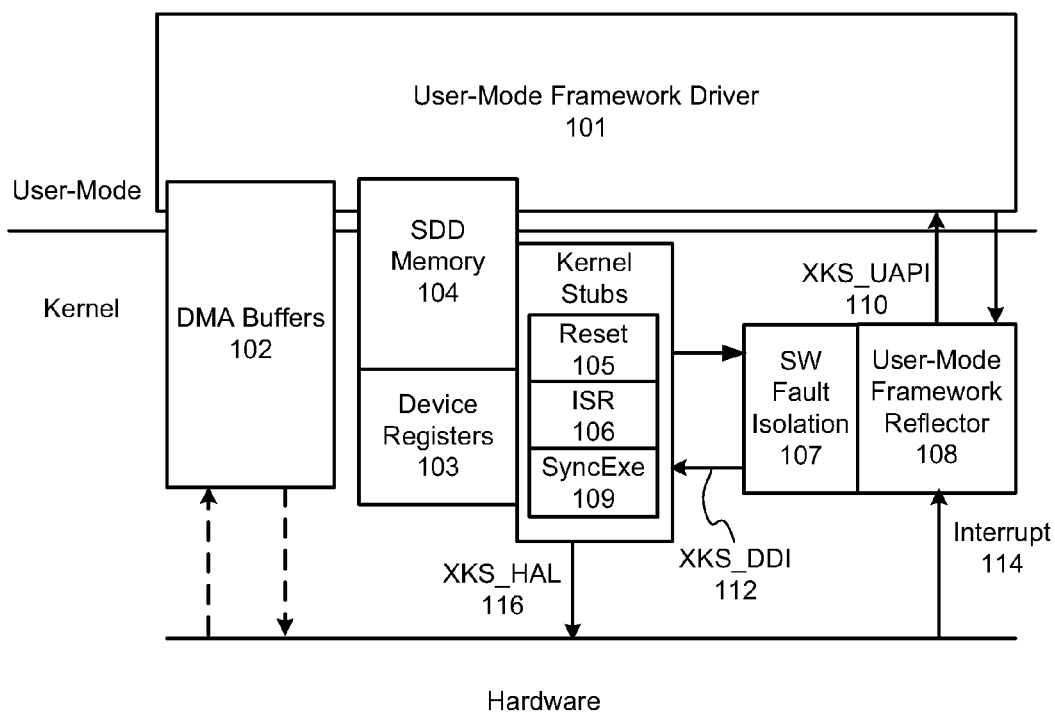
FIG. 1 is a block diagram of an implementation of a system architecture having a synchronized split user-mode/kernel-mode driver architecture.

In operating systems such as MICROSOFT WINDOWS, a user-mode framework supports the creation of user-mode drivers that support, e.g., protocol-based or serial-bus-based devices. In some implementations, the user-mode framework may be a framework such as UMDF available from MICROSOFT. A user-mode framework driver handles I/O requests like kernel-mode drivers, but run in user-mode where they are isolated, thus increasing the stability of the system.

Interrupts associated with direct memory access DMA transfers may be level triggered. The interrupts should be dismissed right in the interrupt context which is at very high priority, i.e., device interrupt request level (DIRQL). It may not be fast enough if the dismissal were to be handled by user mode code which was to be signaled by an interrupt service routine (ISR). Therefore, in some implementations, code resides in the kernel to dismiss the interrupt. A device may or may not have volatile hardware states to be saved while the kernel ISR dismisses the interrupt. Some devices accumulate or preserve interrupt states information until processed. For example, some devices might write to DMA transfer buffers to indicate completions without keeping information in the hardware registers. Others might accumulate interrupts by performing an "or" operation on the bits into the hardware registers such as event A, event B etc., or have a counter indicating how many transfers are completed.

In some implementations, drivers are written completely in a user-mode framework. No code in the kernel results in a very stable implementation, where generic driver functions from a split driver model are sufficient.

In an implementation, a DMA device for a user-mode framework driver is one that implements no device specific kernel code. The device may have the following attributes:

1. The interrupt is edge triggered (this could be a standard line interrupt or a message-signaled interrupt). When this interrupt is triggered a signal is sent to the processing code, i.e., ISR. This ISR may be a generic OS handler which signals the device driver specific handler. Because the processor will not be interrupted again until the interrupt is dismissed, the user-mode device-specific interrupt handler may be used to service the interrupt, and hence requires no device specific kernel code. In computing devices, there may be level triggered and edge triggered interrupts, and this model may also implement a "message based" interrupt mechanism, which has the property that an interrupt may be dismissed at a later time. With edge triggered interrupts, their dismissal may be deferred until the scheduler is able to run the user-mode driver without any system ramifications. Level triggered interrupts, however, will continue to interrupt the system until they are dismissed, so no user-mode code can run until that happens.

2. Interrupt information is reflected in completed buffers or in a hardware register set which is manipulated by user mode code which may synchronize among multiple threads that access hardware registers.

3. Handling of level triggered interrupts that are not shared. This mechanism may be implemented with a minimal amount of kernel-mode code. If the interrupt is not shared, then the interrupt handler may mask the interrupt at the interrupt controller (effectively blocking it) and notify the user-mode driver to handle the device. The user-mode driver code may make a request to the system (reflector, etc.) at the end of processing that unmasks the interrupt line, at which point a new interrupt may come in.

With the above, it is possible to have no device specific kernel code associated with a hardware driver.

In other implementations, hardware may have the following attributes:

1. The interrupt is level triggered. Because an interrupt line may be shared, device specific code resides in the kernel ISR to dismiss the interrupt after confirming that it is the source of the interrupt. These actions may implement device specific knowledge.

2. Hardware registers contain per interrupt information, i.e., they are volatile. Device specific code retains the volatile information when dismissing the interrupt. This may occur when reading the hardware registers resets the content simultaneously.

3. Checking and dismissing interrupts may take a read and a write to the registers for most hardware. Therefore, it is non-atomic. If drivers set up DMA in user-mode, which has to manipulate hardware registers, there may be contention between ISR and the user-mode code.

Thus, an implementation to solve the contention may be to use a stop-and-go strategy where a device is initialized in non-interrupting state. When the user-mode driver receives transfer requests, it sets up one DMA transfer including enabling interrupt for the DMA transaction. The user-mode driver then waits on the interrupt event. At some point, interrupt occurs either due to error or completion of the transfer. The kernel mode ISR dismisses and disables the interrupt, by reading and writing registers, and it signals the user mode ISR which processes the result. The user-mode driver then can continue the next DMA transfer if there is one. This serialization of ISR and DMA request eliminates the contention of accessing hardware registers and any shared resources.

FIG. 1 is a block diagram of an implementation of a system architecture having a synchronized split user-mode/kernel-mode driver architecture 100 implementing the above-noted features and functions. A user-mode framework driver 101 runs in a driver host process that may also host a UMDF and a run-time environment. In some implementations, the driver runs in an environment that is less trusted than the kernel-proper, such as a hosting process or a "driver execution mode" running in a carved-out section of the kernel's protected address space. The user-mode framework driver 101 may run in a ring where the driver runs in a protected "driver-mode" separate from user-mode or kernel-mode, or one where the driver is itself written in a safe language (e.g., C#) which can be trusted by the kernel but which cannot be allowed to run at raised IRQL.

The user-mode framework driver 101 may operate as part of a stack of drivers that manage a hardware device. In an implementation, to provide for hardware that requires a low-latency response, the user-mode framework driver 101 may include kernel stubs loaded into the operating system, and may be device specific code written by, e.g., hardware vendors. The kernel stubs may be provided to handle outstanding DMA transfers and to provide better performance. The stubs are called by a reflector 108 via XKD_DDI 112. The reflector 108 contains code to handle exceptions in stubs caught by SFI 107. The following kernel-mode stubs may be implemented: Stub_Reset 105 (reset), Stub_ISR 106 (ISR) and Stub_SyncExe 109 (SyncExe). These three stubs execute at DIRQL with the interrupt spinlock, hence synchronization is provided for.

Stub_Reset 105:

In some implementations, hardware may have this equivalent to a reset. The reflector initiates this function when the user-mode driver or host terminates abruptly or detects an interrupt storm. An interrupt storm may occur when a driver does not properly dismiss a level triggered interrupt. Implementations to detect and handle interrupt storms are described below. The Stub_Reset 105 may be invoked if errant DMA operations are being performed by a hardware device, if the system's DMA configuration allows for DMA operations to be restricted and reports errors when a device goes outside those restrictions. Stub_Reset 105 may ensure that hardware immediately stops unfinished DMA from further transfer. This also may be called by the user-mode driver to reset the hardware in device initial start or an orderly device stop.

Stub_ISR 106:

This may be called by a reflector ISR wrapper as the result of an interrupt. The ISR checks the hardware status, and if it is its hardware's interrupt, the Stub_ISR 106 dismisses the interrupt. If there is interrupt specific register content, the ISR will save it and queue it to a shared memory. The Stub_ISR returns 106 to a user-mode framework reflector 108 (discussed below) which signals the prearranged event object as indicated by the return code.

Stub_SyncExe 109:

When user-mode drivers need to synchronize accesses to hardware registers or other shared resources with other stubs, they make DeviceIoControl calls to the device in MICROSOFT WINDOWS. The calls may go through the reflector as "fast I/O" which is an optimized delivery mechanism that allows reliable I/O delivery. The reflector 108 synchronizes with a competing stub using an appropriate mechanism (KeSynchronizeExecution for an ISR, KeAcquireSpinlock for a deferred procedure call (DPC), KeWaitForSingleObject for a passive-level stub) and then invokes the specified stub. The Stub_SyncExe 109 function may access a range, i.e., an in-out buffer, which the reflector sets up to carry input and output for it. This is an additional accessible range to the global accessible list for the stub. The input and output of the DeviceIoControl contains information specific to the user mode driver and kernel mode driver. In an implementation, the first field in the input buffer may be a function code, known between the Stub_SyncExe 109 and user mode drivers, so that this is a multiplex into several functions.

The kernel stubs may include a driver context or device context. Execution may be synchronized with these contexts.

The kernel stubs may be untrusted, while executing safely in the kernel because of a software based fault isolation mechanism 107, such as XFI, that allows user-mode framework drivers to add kernel stub to the kernel without possibly corrupting the integrity of the kernel itself, or its subsystems.

A software based fault isolation mechanism 107, such as XFI, may be implemented in software on legacy systems, without requiring fundamental changes to hardware or operating systems and may be seen as a flexible, generalized form of software-based fault isolation (SFI). Thus, if the kernel Stub_ISR 106 is about to perform an operation that may cause system instability (e.g., throw a fault) the XFI runtime guards process this into a safe form of failure notification. This may be a call out to a failure handler. Alternatively, the failure notification could take the form of an immediate "return" from the kernel stubs to its caller, with an appropriate return value.

The kernel stubs may also provide sequencing of operations for hardware devices where certain sequences of operations are timing sensitive and cannot tolerate pauses incurred by context-switching out a user-mode driver. Where a pure user-mode driver would have to be scheduled onto a CPU to acknowledge each of the interrupts, the kernel Stub_ISR 106 reduces this latency because it is invoked by the kernel-mode interrupt handler and may run in an arbitrary context at a raised IRQL. The user-mode framework driver 101 may support multiple devices, and therefore may multiplex requests from multiple devices through a single instance of the kernel Stub_ISR 106.

The kernel stubs and user-mode framework driver 101 may both have access to a region of shared memory, such as the stub device data (SDD) memory 104 to which the kernel stub 106 copies volatile state from the hardware. In some implementations, the kernel stubs may also have a private memory that is inaccessible to the user-mode framework driver 101. This data may be multi-word and the user-mode framework driver may call the kernel stub for "stub operations" that act on this data in a serialized fashion. Alternatively, the kernel stubs may place such multi-word data on a shared list, circular array, or similar data structure, using atomic operations. The SDD memory 104 may be implemented as a device data structure in one or more pages of non-pageable kernel memory, of which only a few bytes (e.g., 16 to 128 bytes) may be used. This page of memory may be double mapped with kernel-mode and user-mode addresses. In an implementation, the kernel stubs write access is limited to the SDD memory 104 or a private memory, and local variables on the stack during its execution.

The user-mode framework driver 101 may transfer data from a system to a device using DMA, which is a capability provided by some computer bus architectures, including PCI, PCMCIA and CardBus, which allows data to be sent directly from an attached device to the memory on the host, freeing the CPU from involvement with the data transfer and thus improving the host's performance. DMA buffers 102 provide a memory where data is buffered as it is communicated to/from the user-mode framework driver 101. The DMA buffers 102 may be allocated as a contiguous buffer or may be fragmented in the physical memory and mapped to a contiguous buffer in the calling process's virtual address space. In some implementations, the DMA buffers 102 may come from requests presented to the user-mode framework driver 101, in which case they may not need to be mapped into the address space of the host or even accessible directly to the stub.

In an implementation, the kernel stubs may include a device interrupt-service routine, and may access multiple device registers 103, in a serialized fashion. The ISR performs operations such as writing volatile state information retrieved from the device to the SDD memory 104, dismissing the interrupt, and may stop the device from interrupting. The ISR may also save state information and queue a deferred procedure call to finish I/O operations at a lower priority (IRQL) than that at which the ISR executes. A driver's ISR executes in an interrupt context, at some system-assigned device interrupt request level, DIRQL.

In some implementations, the kernel Stub_ISR 106 may queue a DPC. A Stub_SyncDPC call may be made such that the host may make to synchronize its code with the DPC. An invoker for the kernel stubs may determine if it is synchronizing with the ISR or the DPC and may have a lock built around the DPC. This allows the kernel stubs to operate at a particular interrupt level, and provides a mechanism for the user-mode framework driver 101 to synchronize with the kernel stub(s) it triggers at that interrupt level.

ISRs are interruptible such that another device with a higher system-assigned DIRQL can interrupt, or a high-IRQL system interrupt can occur, at any time. On multiprocessor systems, before the system calls an ISR, the interrupt's spin lock may be acquired so the ISR cannot simultaneously execute on another processor. After the ISR returns, the system releases the spin lock. Because an ISR runs at a relatively high IRQL, which masks off interrupts with an equivalent or lower IRQL on the current processor, the ISR should return control as quickly as possible. Additionally, running an ISR at DIRQL restricts the set of support routines the ISR can call.

Typically, an ISR performs the following general operations: If the device that caused the interrupt is not one supported by the ISR, the ISR immediately returns FALSE. Otherwise, the ISR clears the interrupt, saving whatever device context is necessary, and queues a DPC to complete the I/O operation at a lower IRQL. The ISR then returns TRUE.

In drivers that do not overlap device I/O operations, the ISR determines whether the interrupt is spurious. If so, FALSE is returned immediately so the ISR of the device that interrupted will be called promptly. Otherwise, the ISR continues interrupt processing. Next, the ISR stops the device from interrupting. If the user-mode framework driver 101 can claim the interrupt from the device, TRUE from its ISR, and the interrupt may be dismissed. Then, the ISR gathers context information for a routine responsible for determining a final status for the current operation (e.g., DpcForIsr or CustomDpc), which will complete I/O processing for the current operation. Next, the ISR stores this context in an area accessible to the DpcForIsr or CustomDpc routine, usually in the device extension of the target device object for which processing the current I/O request caused the interrupt.

If a driver overlaps I/O operations, the context information may include a count of outstanding requests the DPC routine is required to complete, along with whatever context the DPC routine needs to complete each request. If the ISR is called to handle another interrupt before the DPC has run, it may not overwrite the saved context for a request that has not yet been completed by the DPC. If the driver has a DpcForIsr routine, call IoRequestDpc with pointers to the current I/O request packet (IRP), the target device object, and the saved context. IoRequestDpc queues the DpcForIsr routine to be run as soon as IRQL falls below DISPATCH_LEVEL on a processor. In MICROSOFT WINDOWS, if the driver has a CustomDpc routine, the KeInsertQueueDpc is called with a pointer to the DPC object (associated with the CustomDpc routine) and pointer(s) to any saved context the CustomDpc routine will need to complete the operation. Usually, the ISR also passes pointers to the current IRP and the target device object. The CustomDpc routine is run as soon as IRQL falls below DISPATCH_LEVEL on a processor. Functionally similar operations may be performed in other operation systems.

In an implementation, the kernel stubs may be executed in any ring that is granted the ability to run at a raised interrupt level and access hardware and memory. For example, kernel stubs may execute as a strictly serialized sequence of run-to-completion code at ring-zero in the kernel. The kernel stubs also may provide serialized, device-specific access to the SDD memory 104. This may allow the user-mode framework driver to atomically clear status information out from the SDD memory 104, e.g., information about DMA requests that have completed, etc.

In an implementation, non-hardware kernel stub interfaces may be provided by a user-mode framework reflector 108. The user-mode framework reflector 108 may be a kernel-mode Windows Device Mode (WDM) filter driver that is installed at the top of a kernel-mode device stack for each device that a user-mode framework driver 101 manages. The user-mode framework reflector 108 manages communication between the kernel-mode components and the user-mode driver host process.

The user-mode framework reflector 108 may forward I/O, power, and Plug and Play messages from the operating system to the driver host process, so that user-mode drivers can respond to I/O requests and participate in Plug and Play device installation, enumeration, and management. The user-mode framework reflector 108 or the software based fault isolation mechanism 107 may also monitor the driver host process to ensure that it responds properly to messages and completes critical operations in a timely manner, thus helping to prevent driver and application hangs.

When protecting systems against kernel mode drivers using the software fault isolation mechanism 107, the software isolation augments the kernel mode driver such that driver exceptions may be detected. When the software isolation code detects a driver exception, it stops the driver code and unwinds the driver call stacks to return a proper error code back to the user-mode framework reflector 108. The user-mode framework reflector 108 in turn calls a driver provided reset stub 105 that functions like a "kill switch" to stop the hardware from any further operations which may corrupt the system states. The reset stub 105 is provided by the driver at the driver initialization. The "kill switch" stops the hardware immediately, including any outstanding DMA transfers.

In an implementation, the reset stub 105 may be used to stop interrupt storms. When the software based fault isolation mechanism 107 detects exceptions in the driver kernel stub 106, the interrupt may not be dismissed yet. The reset stub 105 may be invoked to stop the subsequent interrupt storms. The reset stub 105 may be used when user-mode framework reflector 108 detects hardware inducing abnormally excessive interrupts. The hardware will be stopped and driver disabled to preserve the system.

A combination of the kernel stubs, the software based fault isolation mechanism 107, or the user-mode framework reflector 108 may monitor for an interrupt storm and reset the device if one occurs. In some implementations, upon detection of an interrupt storm, the ISR may be routed through the user-mode framework reflector 108, or there may be some communication between a kernel interrupt dispatcher and the user-mode framework reflector 108 such that the user-mode framework reflector 108 can detect or be notified when a device is causing an interrupt storm. The user-mode framework reflector 108 may then call Stub_Reset (i.e., the reset stub 105), and then either notify or terminate the host driver.

FIG. 1 illustrates an implementation of interfaces to the kernel-mode portion of the driver architecture 100. The interfaces may include XKS_UAPI interfaces 110 that may allow the UMDF drive to interact with the kernel stubs through the reflector 108, an XKS_DDI interface 112 that may allow the kernel stub for an ISR to signal user-mode code that interrupts have occurred that should be handled, an XKS_ISR interface 114 that may invoke the kernel stub implementing ISR interface upon the occurrence of hardware interrupts, and an XKS_HAL interface 116 that may contain range-checked routines for accessing memory-mapped hardware device registers 103.

In an implementation, the XKS_UAPI interfaces 110 include the following:
NTSTATUS
XksInit (IN DeviceObject do,
IN PVOID SharedSDD, IN ULONG SharedSDDCb,
IN PHANDLE InterruptObjectHandles, IN ULONG InterruptObjectCount,
IN PHANDLE DeviceRegisterHandles, IN ULONG DeviceRegisterCount,
IN PHANDLE DevicePortHandles, IN ULONG DevicePortCount);

In an implementation, this operation allows the user-mode framework driver 101 to initialize its kernel stubs. The operation may specify whether a shared SDD region is created by passing a non-NULL SharedSDD, which may then be pinned and double mapped, etc. The user-mode framework driver 101 (module) may pass resource handles down to the kernel stub as the three array arguments. The kernel stub uses offsets into these arrays as the first argument in the set of XKS_HAL interfaces. Thus, these arrays allow the user-mode framework driver 101 and the kernel stubs to create consistent names for different device resources, e.g., the register at offset 0 is the volatile hardware interrupt status, the register at offset 3 is the volatile hardware number of bytes to read, etc. These offsets may be per resource type, so that there may be an interrupt 0, register 0, and port 0; each array pointer can be NULL if no such resources need to be accessed by the kernel stub.

In an implementation, the operation invokes a kernel stub function that may perform an operation atomically, with respect to interrupts and other SDD accesses, etc.:
NTSTATUS
XksOperation (IN DeviceObject do, IN ULONG OpCode,
IN PVOID InputBuffer, IN ULONG InputBufferCb,
INOUT PVOID OutputBuffer, IN OutputBufferCb,
OUT ULONG *BytesReturned);

In another implementation, if the SDD memory 104 is shared, arguments to operations, and return values, may be passed in SDD memory 104. This may be accomplished by using a kernel billboard ("k-board") portion of SDD memory 104 that is reserved for writing by the kernel stubs, serialized by DIRQL. The k-board is writeable by kernel (or hardware) but read-only to user-mode. The shared location that user-mode driver may write to in order indicate its progress to a user-mode billboard ("u-board") is readable by kernel stub 106 (or hardware). The u-board portion may be reserved for writing by the user-mode framework driver 101, serialized by a lock. Small arguments may be copied between the two regions using compare-and-swap operations; larger, multi-word arguments can be copied using an XksOperation. In an implementation, an XksOperation would copy-and-clear the SDD summary of information retrieved from volatile hardware memory on interrupts, i.e., copy summary data from the k-board into the u-board, and clearing the k-board interrupt summary.

In an implementation, the user-mode framework reflector 108 may send an "interrupt event" to the user-mode framework driver 101 by signaling an event in a DPC:

UPCALL_EVENT XksInterruptEvent

In another implementation, an IPC mechanism may be used to wake up the interrupt thread rather than events.

In an implementation, the XKS_DDI interface 112 may include upcall and downcall interfaces. The upcall interface for kernel stub to call the reflector, may be:

VOID
XksDDI_SignalInterrupt( );

The user-mode framework reflector 108 may invoke the kernel stubs to handle requests for "stub operations" in response to XksOperation calls in the XKS_UAPI. The user-mode framework reflector 108 may call a kernel stub interface at DIRQL holding the proper locks in a manner that allows for safe execution of the kernel stubs using XFI. In an implementation, the downcall interface for the user-mode framework reflector 108 to call an kernel stub operation could be:

NTSTATUS
XksDDI_StubOperation (IN SDD* deviceData, IN ULONG lengthOfSDD,
IN LONG opcode,
IN PVOID InputBuffer, IN ULONG InputBufferCb,
INOUT PVOID OutputBuffer, IN OutputBufferCb,
OUT ULONG *BytesReturned);

Negative opcode numbers may be reserved for definition by the UMDF. In an implementation, negative one (−1) is XKS_STOP_ALL_INTERRUPTS_FROM_HARDWARE_DEVICE, which the kernel stubs handles by disabling the generation of interrupts from the hardware device.

In an implementation, the XKS_ISR interface 114 may be implemented by a small shim in the user-mode framework reflector 108. The XKS_ISR interface 114 may be responsible for watching for interrupt storms. An exemplary ISR interface may be:

BOOLEAN
XSR_InterruptService (IN SDD* deviceData, IN ULONG lengthOfSDD, IN ULONG interruptID);

The above routine may obtain a pointer to the SDD memory 104 as an SDD pointer. It may also discriminate which interrupt this is by, e.g., requiring that the user-mode framework driver register separate ISR routines for different interrupt lines/messages, if the hardware uses multiple such lines. In an implementation, the above routine should return FALSE if the hardware device is not interrupting, but otherwise handles the interrupt to completion and returns TRUE.

In an implementation, the XKS_HAL interface 116 may include routines for reading and writing in 1-byte, 2-byte, 4-byte (and on x64, 8-byte increments), i.e., for chars, shorts, longs, etc. The XKS_HAL may be implemented as accessor methods that go through the user-mode framework reflector.

The routines have the same prototypes as the HAL APIs, shown below for bytes:

VOID WRITE_REGISTER_UCHAR (IN XKS_HANDLE Reg, IN UCHAR Value);
VOID WRITE_REGISTER_BUFFER_UCHAR (IN XKS_HANDLE Reg, IN PUCHAR Buffer, IN ULONG Count);
UCHAR READ_REGISTER_UCHAR (IN XKS_HANDLE Reg);
VOID READ_REGISTER_BUFFER_UCHAR (IN XKS_ HANDLE Reg, IN PUCHAR Buffer, IN ULONG Count);

The HAL operations may refer to hardware resources as XKS_HANDLE, which may be offsets into the array passed down in the XksInit operation. The XKS_HANDLE handles may be mapped to actual resource addresses in a manner that can be trusted, e.g., by invoking accessor code in the user-mode framework reflector 108, or through use of the software based fault isolation mechanism 107 (XFI). In some implementations, the handles may be the actual addresses of memory-mapped hardware registers. In either case, they may be bounds checked, so that the kernel stub 106 cannot overflow a memory-mapped device control region.

In the implementations above, the user-mode framework driver 101 may pass the names of handles down to the kernel stubs in a device-specific manner. This may be implemented using a structure in the u-board in the SDD memory 104. In addition to the above, accessor methods for I/O ports may be provided. In an implementation, support routines (implemented as macros) that manipulate linked lists and other data structures resident in the SDD memory 104 may be provided.

In an implementation, the user-mode framework driver 101 may refer to the kernel stubs by invoking the UMDF interfaces 110 and by sharing the same logic and data structures (e.g. through a common header file) with the kernel stubs. The kernel stubs may manipulate variables on the stack, as well as hardware device registers, and has write access to a small region of memory.

The kernel stubs may refer to portions of the SDD memory 104 that are shared with the user-mode framework driver 101 and that are private. In an implementation, this may be performed by having the kernel stub source code define global variables with reserved names (e.g., PrivateSDD_Struct and SharedSDD_Struct) that are turned into device-local references by the XFI rewriter. This may make all global variables into device-global variables for kernel stubs.

The stack can be used to hold most of the writable relevant data, including the allocation stack. Alternatively, since the ISR code may be strictly serialized, the allocation stack, SDD, and INIT data may all be stored in a single, contiguous region of non-paged memory. This region may be used to hold writable global variables present in the kernel stub 106.

The stack may hold a deviceObject or interruptObject like data structure that serves as a point of indirection for kernel stub memory activity. This object may also be passed along from the kernel stubs whenever it accesses support routines. A pointer to this object may be stored in a reserved, immutable register (e.g., EBP) or it may be passed along as an extra implicit argument to the functions in the kernel stubs, e.g., with the code written to do this explicitly or, alternatively, to provide a more attractive programming model, the programmers of kernel stub 106 could reference a global variable that is properly expanded by the rewriter.

Figure 2:
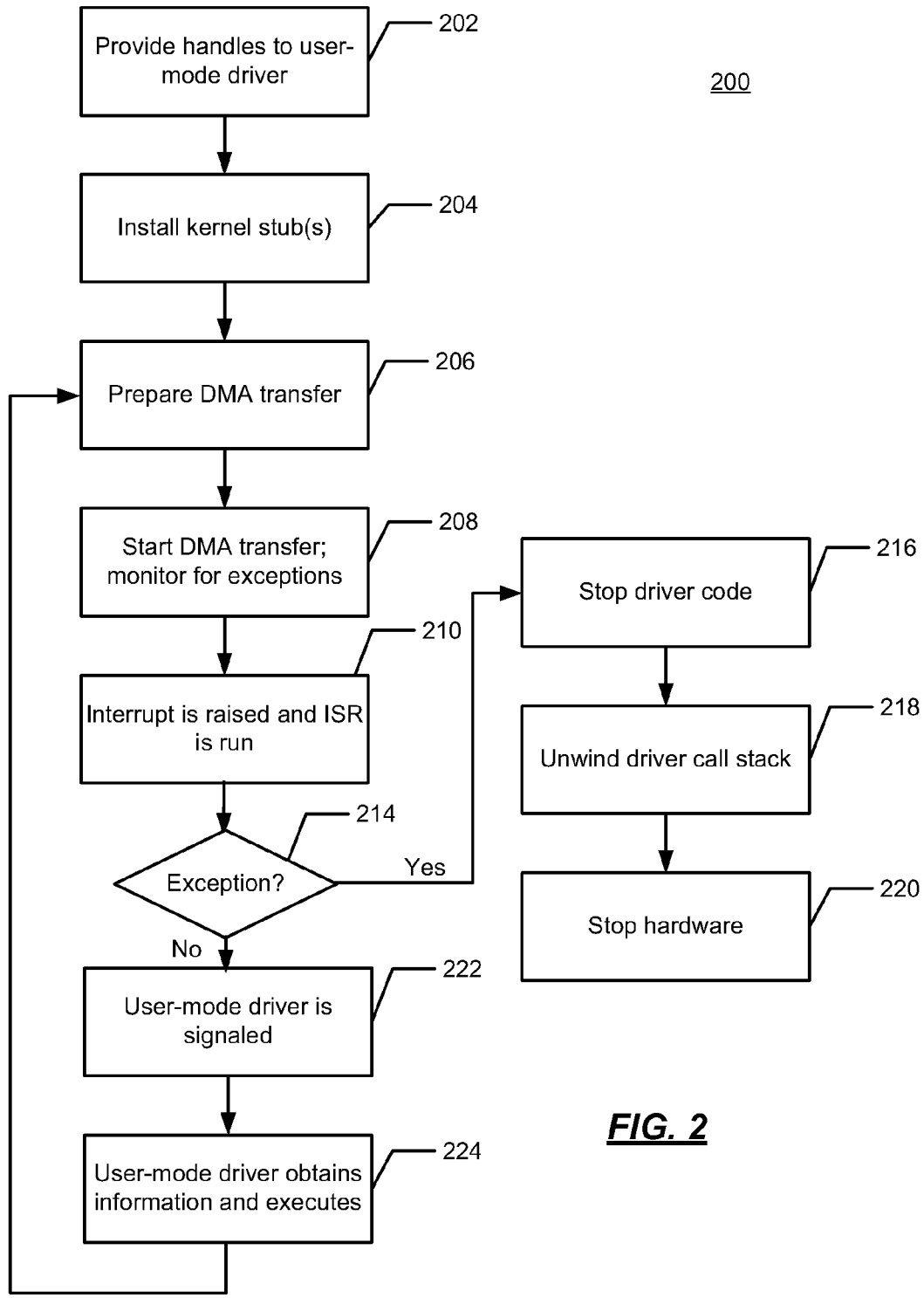
FIG. 2 is an operational flow of an implementation of a process performed by a driver and monitoring for exceptions.

FIG. 2 is an exemplary process 200 performed by a driver 101. At 202, a UMDF user-mode driver provided handles to the hardware resources assigned to it. This may include handles to memory-mapped hardware registers, interrupt objects, etc. At 204, the stubs (e.g., reset, ISR or SyncExe) are installed and INIT data is provided summarizing information to the stub. This may include information obtained at 202 regarding hardware researches, handles etc. The kernel stub 106 may be installed in the in the SDD memory 104. The reset stub 105 is provided by the driver at the driver initialization.

At 206, the UMDF user-mode code prepares a DMA transfer. The user-mode framework driver 101 may invoke the kernel stub 106 to perform device programming for this DMA operation.

At 208, the user-mode device driver synchronizes access to hardware resources or shared resources and monitoring for exceptions begins. SyncExec may be performed to start the DMA transfer. The user-mode drivers may synchronize accesses to hardware registers or shared resources by making DeviceIoControl calls to the device. The calls go through the reflector 108 which calls this stub function with KeSynchronizeExecution. This stub function may access a range, i.e. an in-out buffer, which the reflector sets up to carry input and output for it. Exceptions may include conditions such as an interrupt storm.

At 210, a hardware device raises an interrupt. Executable code within kernel stub 106 for the ISR is invoked that copies volatile device state into the SDD memory 104. At 212, the user-mode framework driver is signaled. This may be performed through the ISR execution.

At 216, it is determined if an exception occurred. The exception may be an interrupt storm. The SFI 107 detects exceptions in kernel mode. The reflector 108 receives the indications of exception in kernel mode and takes actions to stop driver at 216. At 218, the driver call stack is unwound, and at 220 the hardware is stopped in kernel mode without signaling the user mode driver.

If no exception is detected at 214, then at 222, the user-mode driver is signaled. At 224, UMDF code executes to obtain information about the interrupt. The may be performed by copying and clearing bits from the SDD memory 104 (i.e., calling a kernel stub operation for multi-word information). For instances where unsynchronized access to the SDD memory 104 is safe, e.g., when it is a distinct word of memory that can be accessed atomically, the user-mode code can just read or write the SDD memory 104. In the other cases, the user-mode framework driver 101 may call the kernel stub 106 to synchronize with the ISR, copy the state of the SDD memory 104 into a buffer, and then release the interrupt lock and return. If a hardware device programmed to perform multiple operations sends an interrupt whenever each operation completes, the ISR within the kernel stub 106 may acknowledge the interrupts at 214 to allow operations to complete as soon as possible. If a hardware device only performs one DMA operation at a time and interrupts when done, the kernel stub 106 may acknowledge interrupts for completed DMA at 214 and issue new DMA operations. This may be performed by maintaining a list of completed DMA operations and a list of future DMA operations to issue in the SDD memory 104. Stages 206 through 214 may be repeated for multiple outstanding types of hardware operations, and multiple types of events may be signaled in stage 210 and 222.

Figure 3:
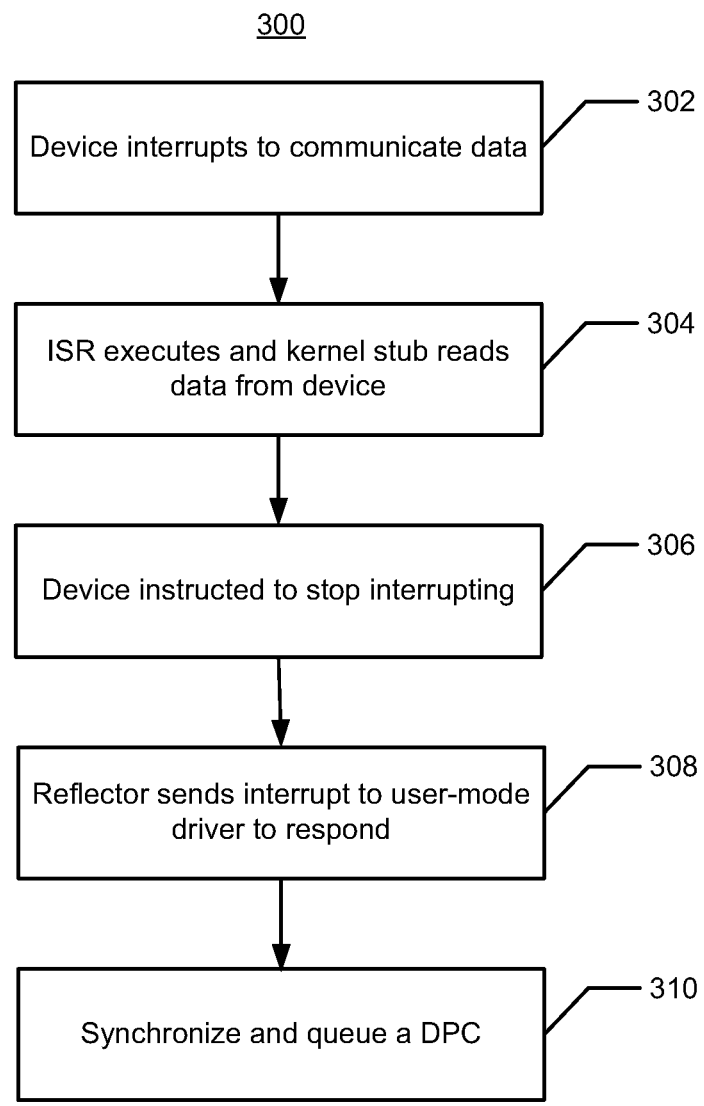
FIG. 3 is an operational flow of an implementation of a process to receive data from a peripheral device and synchronizing the driver.

FIG. 3 is an exemplary process 300 of processing data received from a peripheral device communicating to computing system using the implementations of FIGS. 1 and 2. The process 300 may be used to synchronize a DPC. The received data may be a packet received from a peripheral, such as a network device. At 302, when a packet comes in to the network device, an interrupt is triggered by the network device. This may include a call to the XKS_ISR interface 114. At 304, information about the network packet is read out of the network device. This may be performed by the kernel stub 106. At 306, the device is instructed to stop interrupting. Device driver interfaces (XKS_DDI 112) may be used to manage the network device and to inform the kernel stub 106 to finish processing the interrupt. The XKS_DDI 112 may also inform the user-mode framework reflector 108 that an interrupt was received and the information needs to be recorded.

At 308, the user-mode framework reflector 108 sends a software interrupt to the user-mode framework driver 101 to take control of the processing. At 310, the user-mode framework driver 101 may synchronize access with registers and other resources. The ISR or kernel stub 106 may queue a deferred procedure call to finish I/O operations at a lower priority (IRQL) than that at which the ISR executes.

Exemplary Computing Arrangement

Figure 4:
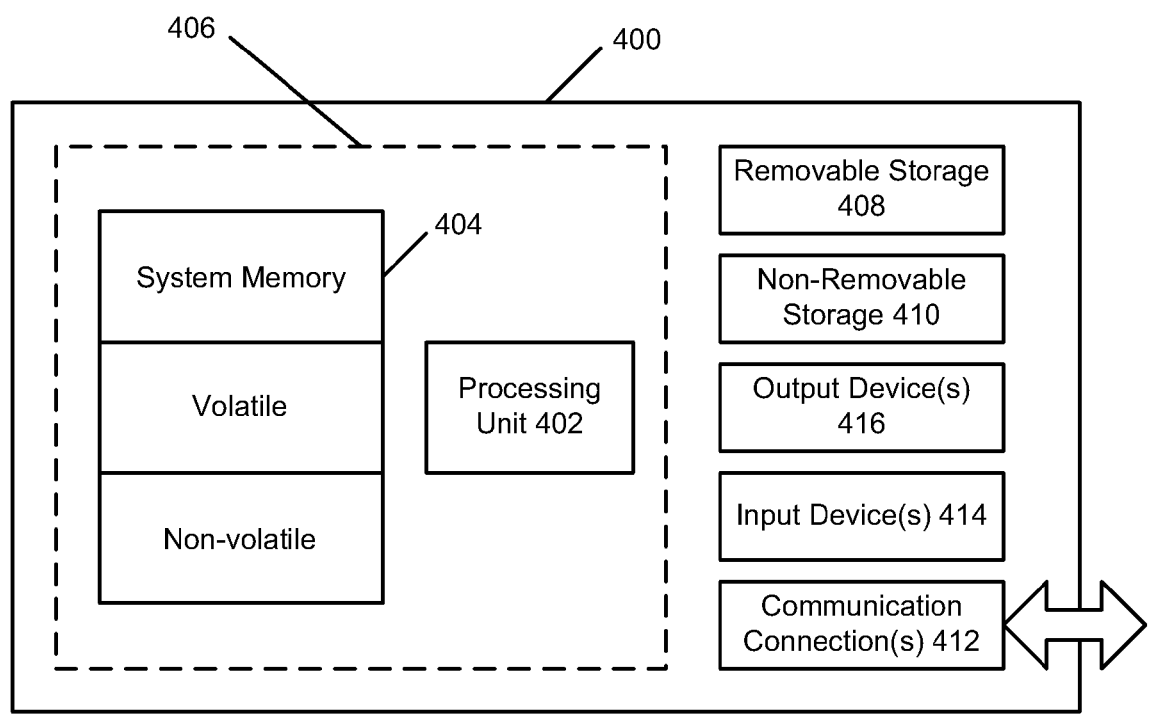
FIG. 4 shows an exemplary computing environment.

FIG. 4 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
   loading a user-mode driver associated with a device;
   loading a plurality of kernel stubs associated with the user-mode driver in a kernel of an operating system, the kernel stubs including a reset stub associated with the device and the reset stub is provided by the user-mode driver;
   providing the plurality of kernel stubs access to a shared memory space that is shared between the plurality of kernel stubs and the user-mode driver;
   synchronizing the plurality of kernel stubs and the user-mode driver using a deferred procedure call (DPC);
   providing a software based fault isolation mechanism to execute the plurality of kernel stubs;
   receiving an interrupt;
   invoking one of the kernel stubs via a kernel-mode interrupt handler to perform an interrupt service routine such that the interrupt service routine is run in an arbitrary context at a raised interrupt request level;
   and monitoring for a device exception caused by an interrupt storm using the software based fault isolation mechanism, wherein the interrupt storm occurs when the user-mode driver does not properly dismiss an interrupt.

2. The method of claim 1, further comprising: protecting the kernel from faults using the software based fault isolation mechanism.

3. The method of claim 1, further comprising: completing I/O operations at a lower priority interrupt request level than that at which the interrupt service routine executes.

4. The method of claim 1, further comprising: stopping user-mode driver execution if a device exception is encountered using the reset stub.

5. The method of claim 4, further comprising:
   unwinding a driver call stack associated with the device;
   and stopping the device.

6. A method, comprising:
   receiving an interrupt from a hardware device;
   executing an interrupt service routine in one of a plurality of kernel stubs that is invoked by a kernel-mode interrupt handler such that the interrupt service routine is run in an arbitrary context at a raised interrupt request level, wherein the plurality of kernel stubs include a reset stub and the reset stub is provided by a user-mode driver;
   calling a deferred procedure call to synchronize the one of the plurality of kernel stubs with the interrupt service routine and synchronizing the one of the plurality of kernel stubs with the user-mode driver;
   sharing information between the user-mode driver and the one of the plurality of kernel stubs regarding the hardware device and the received interrupt in a shared memory;
   monitoring for an exception caused by an interrupt storm, wherein the interrupt storm occurs when the user-mode driver does not properly dismiss an interrupt;
   reading information from the hardware device by the one of the plurality of kernel stubs;
   and sending the received interrupt to the user-mode driver.

7. The method of claim 6, further comprising:
   managing communication between the one of the plurality of kernel stubs and the user-mode driver using a reflector;
   providing a software based fault isolation mechanism;
   and stopping the hardware device using the reset stub when an exception is encountered.

8. The method of claim 7, further comprising:
   stopping the user-mode driver;
   and unwinding a driver call stack associated with the hardware device.

9. The method of claim 6, further comprising:
   notifying a reflector using the one of the plurality of kernel stubs;
   and disabling the hardware device to stop the interrupt storm.

10. The method of claim 6, further comprising: providing the user-mode driver and the kernel stubs at a same interrupt level.

11. A device driver framework in a computing system, comprising:
    a processor;
    a user-mode module;
    a plurality of kernel stubs that includes a reset stub, wherein the reset stub is associated with a device and is provided by the user-mode module;
    a kernel stub interrupt service routine that is invoked by a kernel-mode interrupt handler such that the kernel stub interrupt service routine is run in an arbitrary context at a raised interrupt request level;
    a software based fault isolation mechanism;
    a shared memory to share information between the user-mode module and the kernel stubs;
    and a reflector to manage communication between the user-mode module and the kernel stubs,
    wherein one of the plurality of kernel stubs invokes the interrupt service routine in response to an interrupt received from the device,
    wherein the software based fault isolation mechanism monitors for exceptions caused by an interrupt storm thrown by the device associated with the user-mode module,
    wherein the interrupt storm occurs when a user-mode driver does not properly dismiss an interrupt, and wherein the one of the plurality of kernel stubs calls a deferred procedure call (DPC) to synchronize with one of an interrupt service routine and the user-mode module.

12. The device driver framework of claim 11, wherein if the software based fault isolation mechanism detects an exception, the device is stopped.

13. The device driver framework of claim 12, wherein the user-mode module is stopped and a driver call stack is unwound.

14. The device driver framework of claim 13, wherein the user-mode module and the kernel stubs are provided at a same interrupt level, and wherein the DPC processes I/O requests at a lower interrupt level.

* * * * *